US012540902B2

(12) United States Patent
Arnedo Gil et al.

(10) Patent No.: US 12,540,902 B2
(45) Date of Patent: Feb. 3, 2026

(54) CONTACTLESS DETERMINATION OF COATING FEATURES (71) Applicant: DAS-NANO TECH S.L., Tajonar (ES)

(72) Inventors: Israel Arnedo Gil, Pamplona (ES); Mikel Subiza García, Tajonar (ES); Igor Artieda Monge, Pamplona (ES); Eduardo Azanza Ladrón, Gorraiz (ES); Andrea Inés Ortigosa, Tajonar (ES); Mónica Castrillo Cuartango, Tajonar (ES); Cristian Martínez De Morentin Suescun, Tajonar (ES); Luis Miranda Santafé, Tajonar (ES)

(73) Assignee: DAS-NANO TECH S.L., Tajonar (ES)

( * ) Notice: Subject to any disclaimer, the term of this patent is extended or adjusted under 35 U.S.C. 154(b) by 395 days.

(21) Appl. No.: 18/020,597

(22) PCT Filed: Oct. 16, 2020

(86) PCT No.: PCT/EP2020/079168
§ 371 (c)(1),
(2) Date: Feb. 9, 2023

(87) PCT Pub. No.: WO2022/033710
PCT Pub. Date: Feb. 17, 2022

(65) Prior Publication Data
US 2023/0304938 A1 Sep. 28, 2023

(30) Foreign Application Priority Data
Aug. 12, 2020 (EP) .................................... 20382744

(51) Int. Cl.
*G01N 21/84* (2006.01)
*G01B 11/06* (2006.01)
(Continued)

(52) U.S. Cl.
CPC ..... *G01N 21/8422* (2013.01); *G01B 11/0625* (2013.01); *G01H 9/00* (2013.01);
(Continued)

(58) Field of Classification Search
CPC .. G01H 9/00; G01B 11/0625; G01N 21/8422; G01N 21/3581
See application file for complete search history.

(56) References Cited

U.S. PATENT DOCUMENTS

2005/0098728 A1\* 5/2005 Alfano ............... G01N 21/3581
250/341.8
2010/0195090 A1\* 8/2010 Ohtake .............. G01B 11/0625
356/51

(Continued)

OTHER PUBLICATIONS

Ellrich F et al., "Terahertz Quality Inspection for Automotive and Aviation Industries", Nov. 26, 2019 (Nov. 26, 2019), vol. 41, No. 4, p. 470-489, XP037106915 DOI: 10.1007/S10762-019-00639-4 external link ISSN:1866-6892, Journal of Infrared, Millimeter, and Terahertz Waves, Springer, Midtown Manhattan, NY.

(Continued)

*Primary Examiner* — Helen C Kwok
(74) *Attorney, Agent, or Firm* — Peter B Scull (57) ABSTRACT Systems and methods are provided for contactless determining feature(s) of a layered coating. Such systems may include determiner unit and measurement unit including coating scanner, vibration explorer and optical arrangement. Coating scanner includes ingress-protected transmitter to emit scanning radiation, and ingress-protected receiver to sense interaction radiation caused by interaction of scanning radiation with coating layer(s). Vibration explorer includes ingress-protected emitter to emit exploration radiation, and ingress-protected sensor to sense reflection radiation caused by reflection of exploration radiation on coating to detect a vibration of the coating depending on the reflection radia- (Continued)

tion. Optical arrangement guides scanning radiation and/or exploration radiation towards common radiation direction, and guides interaction radiation towards ingress-protected receiver and/or reflection radiation towards ingress-protected sensor. Determiner unit determines coating feature(s) depending on interaction radiation sensed by coating scanner and vibration detected by vibration explorer. Methods and computer programs performable in said systems are also provided.

18 Claims, 5 Drawing Sheets

(51) Int. Cl.
    *G01H 9/00*     (2006.01)
    *G01N 21/3581*     (2014.01)
    *G01N 29/04*     (2006.01)
    *G01N 35/00*     (2006.01)

(52) U.S. Cl.
    CPC ......... *G01N 21/3581* (2013.01); *G01N 29/04* (2013.01); *G01N 35/0099* (2013.01); *G01N 2021/8427* (2013.01); *G01N 2291/0237* (2013.01); *G01N 2291/102* (2013.01)

(56) References Cited

U.S. PATENT DOCUMENTS

| | | | | |
|---|---|---|---|---|
| 2012/0326037 | A1* | 12/2012 | Ohtake | G01B 11/0633 |
| | | | | 250/338.1 |
| 2013/0204577 | A1* | 8/2013 | Savard | G01B 11/0691 |
| | | | | 702/172 |
| 2015/0212060 | A1* | 7/2015 | Van Mechelen | G01N 21/59 |
| | | | | 250/338.1 |
| 2015/0268030 | A1* | 9/2015 | White | G01N 21/8901 |
| | | | | 250/353 |
| 2019/0128661 | A1* | 5/2019 | Adams | G01B 11/0633 |
| 2019/0331476 | A1* | 10/2019 | Ochiai | G01B 11/06 |
| 2019/0383599 | A1* | 12/2019 | Gregory | G01N 33/32 |
| 2020/0240909 | A1 | 7/2020 | Maas et al. | |
| 2020/0306780 | A1* | 10/2020 | Maas | B05B 16/20 |

OTHER PUBLICATIONS

International Search Report and Written Opinion of the International Searching Authority. International Application No. PCT/US2020/079168 issued by the European Patent Office, mail date May 7, 2021, 16 pages, European Patent Office, Rijswijk, NL.

* cited by examiner

CONTACTLESS DETERMINATION OF COATING FEATURES

The present disclosure relates to systems for contactless determination of one or more features of a coating with various layers. The present disclosure further relates to methods performable in or by such systems, and to computer programs suitable for performing said methods.

BACKGROUND

Different methods and systems are known for contactless determining of features of a coating with one or more layers. A typical coating feature that is extracted by said known methods and systems is thickness of the coating or thickness of each layer of the coating.

Some of said known methods and systems are not suitable for environments with disturbing elements such as e.g. dust, water, paint particles or other external agents that are normally present in e.g. manufacturing lines. Said methods and systems are based on very sensitive components and, therefore, may produce distorted results due to disturbances caused by dust, water, paint particles or other disturbing agents.

Some other known methods and systems for contactless determination of features of a coating do not produce good results due to vibration(s). It is known that in manufacturing lines, vibrations are very present and are unavoidable. Therefore, said other methods and systems are not suitable for such kinds of environments with vibrations.

An object of the disclosure is to provide new methods, systems and computer programs that may be aimed at solving at least some of the aforementioned problems.

SUMMARY

In an aspect, a system is provided for contactless determination of one or more features of a coating with one or more layers. The system includes a plurality of units having a determiner unit and a measurement unit. The measurement unit includes a coating scanner, a vibration explorer and an optical arrangement. The coating scanner includes an ingress-protected transmitter configured to emit a scanning radiation and an ingress-protected receiver configured to sense an interaction radiation caused by interaction of the scanning radiation with the one or more layers of the coating. The vibration explorer includes an ingress-protected emitter configured to emit an exploration radiation and an ingress-protected sensor configured to sense a reflection radiation caused by reflection of the exploration radiation on the coating to detect a vibration of the coating depending on the reflection radiation. The optical arrangement is configured to guide the scanning radiation and/or the exploration radiation towards a common radiation direction and to guide the interaction radiation towards the ingress-protected receiver and/or the reflection radiation towards the ingress-protected sensor. The determiner unit is configured to determine the one or more features of the coating depending on the interaction radiation sensed by the coating scanner and the vibration detected by the vibration explorer.

The systems and methods hereof permit obtaining very effective results in environments with vibrations and disturbing particles, such as e.g. dust, water, paint particles, etc. Typical environments of this type are e.g. manufacturing lines. The systems and methods hereof permit the ingress-protected coating scanner and the ingress-protected vibration explorer to coexist and cooperate in same system and/or method in more reliable manner in comparison with prior systems. The optical arrangement permits respective radiations emitted by the coating scanner and the vibration explorer to converge in final path to impinge on substantially same point or area of the coating. Hence, a double effect is simultaneously obtained with the suggested system: cooperative coexistence of ingress-protected coating scanner and ingress-protected vibration explorer in same system, and with reliable vibration compensation because both radiations emitted by coating scanner and vibration explorer are guided to impinge on substantially same point or area of the coating. Such a coincidence of impinging points or areas implies that vibrations are detected at same point where coating is examined and, therefore, more reliable vibration compensation(s) may be applied.

Ingress protections used in systems according to present disclosure may satisfy corresponding standard including classification and rating of the degree of protection provided by mechanical casings and electrical enclosures against intrusion, dust, accidental contact, and water. Examples of such standards are e.g. the European standard EN 60529, the IEC standard 60529, etc. Said IEC standard 60529 is sometimes seen as the International Protection Code, and is published by the International Electro technical Commission (IEC).

According to some implementations, the optical arrangement may include at least one mirror configured to reflect the scanning radiation and/or the exploration radiation towards the common radiation direction, and at least one mirror configured to reflect the interaction radiation towards the ingress-protected receiver and/or the reflection radiation towards the ingress-protected sensor. Each of the mirrors may be movable so that its inclination may be adjusted to optimize the reflection of the scanning radiation and/or the exploration radiation on corresponding mirror, and the reflection of the interaction radiation and/or the reflection radiation on corresponding mirror. The at least one mirror to reflect scanning radiation and/or exploration radiation and the at least one mirror to reflect interaction radiation and/or reflection radiation may be, in some configurations, the same at least one mirror. In some examples, just a single mirror may suffice to provoke all reflections.

In configurations, the optical arrangement may include at least one lens configured to guide the scanning radiation and/or the exploration radiation towards the common radiation direction and at least one lens configured to guide the interaction radiation towards the ingress-protected receiver and/or the reflection radiation towards the ingress-protected sensor. The at least one lens to guide scanning radiation and/or exploration radiation and the at least one lens to guide interaction radiation and/or reflection radiation may be, in some configurations, the same at least one lens. In some examples, just a single lens may suffice to provoke all desired guiding.

Guidance of corresponding radiation(s) by the lens or lenses may be implemented through suitable focusing features, and/or proper collimation features, and/or transparency features, and/or any other convenient optical features of the lens or lenses.

In some examples, the plurality of units may include a positioner unit configured to move the measurement unit towards a target position relative to the coating to be examined. The target position may be such that the common radiation direction is substantially perpendicular to the coating. The target position may be such that the ingress-protected transmitter of the coating scanner and/or the ingress-protected emitter of the vibration explorer is distanced from the coating at a target distance.

The positioner unit may include a position detector configured to detect when the measurement unit reaches the target position. The position detector may be based on e.g. a set of triangulation sensors which may be aided or not by the vibration explorer. Such a triangulation system may use information from the vibration explorer to detect when the measurement unit reaches the target position. This way, target position may be detected more reliably. The positioner unit may include an actuator configured to move the measurement unit towards the target position. The actuator may include, for example, a robotic arm or the like.

In some configurations, the coating scanner may be a Terahertz or THz scanner.

In a further aspect, a method is provided of contactless determining one or more features of a coating with one or more layers. The method may include operating a coating scanner (in measurement unit), operating a vibration explorer (in measurement unit), and operating a determiner unit. The coating scanner is operated to cause an ingress-protected transmitter of the coating scanner to emit a scanning radiation, and to cause an ingress-protected receiver of the coating scanner to sense an interaction radiation caused by interaction of the scanning radiation with the one or more layers of the coating. The vibration explorer is operated to cause an ingress-protected emitter of the vibration explorer to emit an exploration radiation, and to cause an ingress-protected sensor of the vibration explorer to sense a reflection radiation caused by reflection of the exploration radiation on the coating to detect a vibration of the coating depending on the reflection radiation. An optical arrangement (in measurement unit) guides the scanning radiation and/or the exploration radiation towards a common radiation direction, and guides the interaction radiation towards the ingress-protected receiver and/or the reflection radiation towards the ingress-protected sensor. The determiner unit is operated to cause the determination of the one or more features of the coating depending on the interaction radiation sensed by the coating scanner and the vibration detected by the vibration explorer.

In some examples, operating the determiner unit may include generating a simulated signal based on a physical model, and performing an optimization process to optimize one or more parameters of the physical model to modify the simulated signal until the simulated signal fits the interaction radiation sensed by ingress-protected receiver of the coating scanner. The optimization process may be based on at least one of the following techniques: discrete Differential Evolution, Topographical Global Optimization, Basin-hopping, SHG or Dual Annealing. The optimization process may be an adaptive and iterative optimization process with stopping criteria based on an error function. The optimization process is performed in time domain and/or in frequency domain.

The simulated signal may be determined as fitting the sensed interaction radiation when a deviation between the simulated signal and the sensed interaction radiation is within an acceptability threshold.

The one or more features of the coating may be determined depending on the optimized one or more parameters of the physical model. Since said optimized parameters have caused the fitting of the simulated signal into the sensed interaction radiation, said optimized parameters characterize the interaction of the scanning radiation with the one or more layers of the coating. In particular, the one or more features of the coating may be determined depending on the optimized one or more parameters of the physical model and on a vibration compensation based on the vibration detected by the vibration explorer.

In some implementations, the method may further include storing knowledge obtained during execution of the method in a knowledge base. Said knowledge may include one or more knowledge items, such as e.g. an optimized physical model, optimized one or more parameters of the physical model, an evolution of the one or more parameters during optimization process, determined one or more features of the coating, their correlation/relationship with one or more of the other knowledge items, etc.

The optimization process may include retrieving from the knowledge base an optimized physical model to be used as the physical model to generate the simulated signal.

Operating the coating scanner to cause sensing of the interaction radiation may include applying to the sensed interaction radiation one or more filtering techniques for noise reduction. Filtering techniques for noise reduction may include e.g. Recursive Least Squares filter, Wiener-Kolmogorov filter, Least Mean Square Error, Kalman filter, Bishrink filter, Theoretical-noise-free representation of the sensed interaction radiation, Genetic Algorithms combined with adaptive thresholding, matched filter and thresholding functions along with transformation techniques such as Fourier, Wavelets and Empirical Mode Decomposition EMD, etc.

The one or more coating features that are determinable by methods according to the present disclosure may include one or more of the following features: number of layers, thickness per layer, layer blending level, refractive index per layer, electrical parameters per layer, magnetic parameters per layer, electromagnetic parameters per layer, Fresnel coefficients, propagation constants, propagation angles, and/or roughness.

In a still further aspect, a computer program is provided comprising program instructions for causing a computing system to perform methods of contactless determining coating feature(s), such as the ones described in other parts of the disclosure. The computer program may be embodied on a storage medium and/or carried on a carrier signal.

In a still further aspect, a computing system is provided for contactless determining coating feature(s), the computing system comprising a memory and a processor, embodying instructions stored in the memory and executable by the processor, and the instructions comprising functionality or functionalities to execute methods of contactless determining coating feature(s), such as the ones described in other parts of the disclosure.

BRIEF DESCRIPTION OF THE DRAWINGS

Non-limiting examples of the disclosure will be described in the following, with reference to the appended drawings, in which.

DETAILED DESCRIPTION OF EXAMPLES

Figure 1:
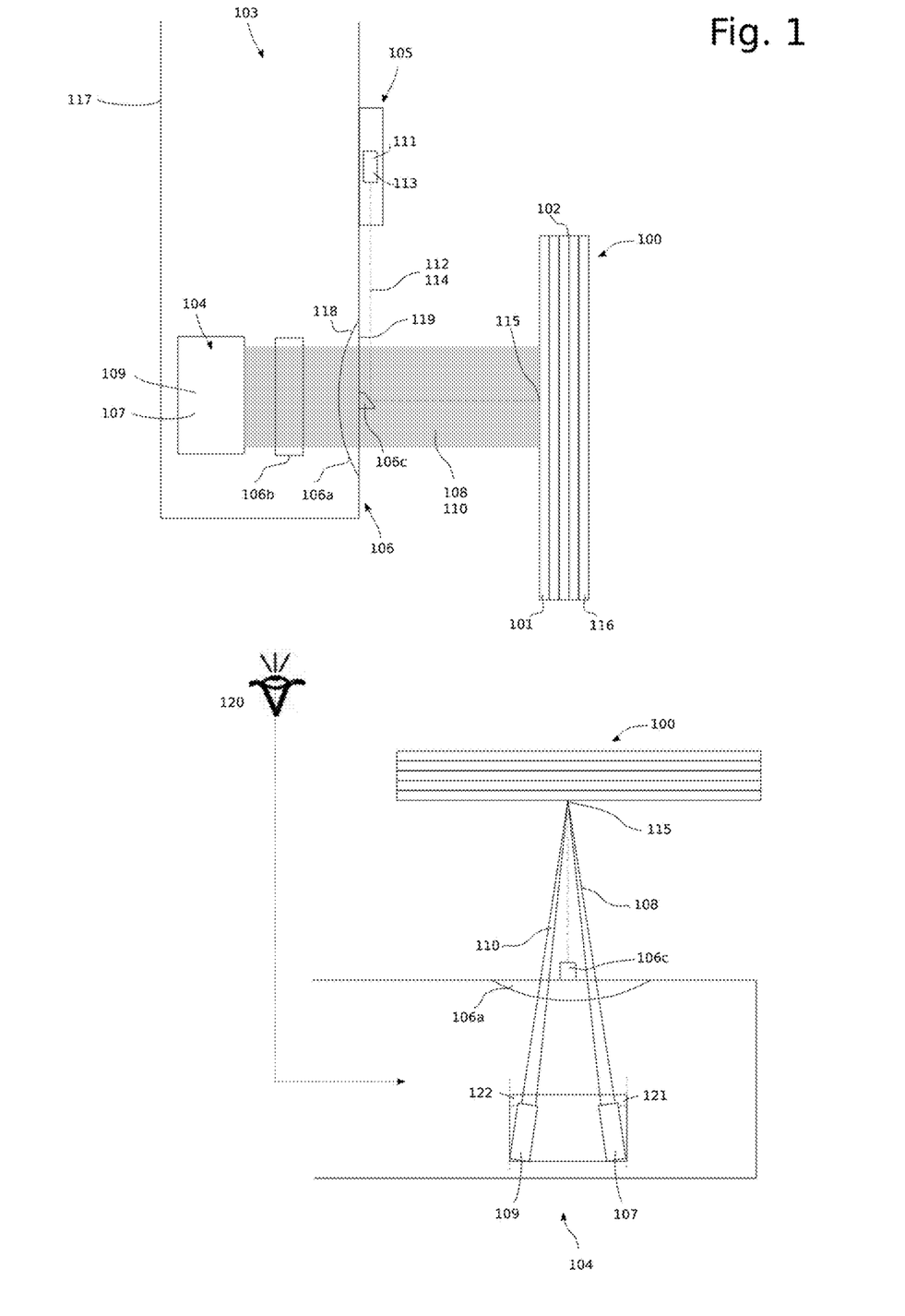
FIG. 1 is a block diagram schematically illustrating systems for contactless determining coating feature(s) according to examples.

FIG. 1 is a block diagram schematically illustrating systems for contactless determining feature(s) of a coating 100 according to examples. The coating 100 may comprise layers 102 with an outermost layer 101 and an innermost layer 116. As generally illustrated in this figure, such systems for contactless determination of feature(s) of a layered coating 100 may comprise a plurality of units or modules having a determiner unit or module (not shown) and a measurement unit or module 103 including a coating scanner module 104, a vibration explorer module 105 and an optical arrangement module 106. The coating scanner 104 may include an ingress-protected transmitter 107 configured in such a way that, in use, emits a scanning radiation 108, and an ingress-protected receiver 109 configured in such a way that, in use, senses an interaction radiation 110 caused by interaction of the scanning radiation 108 with the layer(s) 102 of the coating 100. The vibration explorer 105 may include an ingress-protected emitter 111 configured in such a way that, in use, transmits or emits an exploration radiation 112, and an ingress-protected sensor 113 configured in such a way that, in use, receives a reflection radiation 114 caused by reflection of the exploration radiation 112 on the coating 100 to detect a vibration of the coating 100 depending on the reflection radiation 114.

According to FIG. 1, scanning radiation 108 may be emitted substantially perpendicular to the coating 100, and exploration radiation 112 may be emitted with longitudinal axis thereof substantially perpendicular to longitudinal axis of scanning radiation 108. Interaction radiation 110 may follow an expected "reverse" path (from coating 100 to coating scanner 104) caused by interaction of the scanning radiation 108 with layers 102 of the coating 100. Similarly, reflection radiation 114 may also follow expected "reverse" path (from coating 100 to vibration explorer 105) caused by reflection of the exploration radiation 112 on the coating 100. In alternative setups, arrangement of coating scanner 104 and of vibration explorer 105 may be interchangeable between each other and the overall setup may produce same or similar effects as described with respect to FIG. 1.

The optical arrangement 106 may be configured in such a way that, in use, guides the scanning radiation 108 and/or the exploration radiation 112 towards a common radiation point/direction 115 and guides the interaction radiation 110 towards the ingress-protected receiver 109 and/or the reflection radiation 114 towards the ingress-protected sensor 113. In particular, as generally shown in FIG. 1, the optical arrangement 106 may include a mirror 106c configured to reflect the exploration radiation 112 (from the ingress-protected emitter 111) towards the common radiation point/direction 115 and the reflection radiation 114 (from the coating 100) towards the ingress-protected sensor 113. In alternative implementations, the exploration radiation 112 may be emitted "directly" (i.e. without any redirection or reflection) perpendicularly towards the coating 100, and corresponding mirror may reflect the scanning radiation 108 perpendicularly towards the coating 100 and the interaction radiation 110 towards the ingress-protected receiver 109.

According to the particular examples of FIG. 1, the mirror 106c may change direction of the exploration radiation 112 and of the reflection radiation 114 by substantially 90° in each case. This is consistent with the fact that, in said particular examples, the scanning radiation 108 is emitted "directly", i.e. without any redirection/reflection, and substantially perpendicularly towards the coating 100, and the exploration radiation 112 is emitted substantially perpendicular to the scanning radiation 108. Same or similar principles may be applicable to interaction radiation 110 and reflection radiation 114 but in reverse direction relative to scanning radiation 108 and exploration radiation 112, respectively.

The mirror 106c may be movable to adjust an inclination of the mirror 106c so as to optimize the reflection of the scanning radiation 108 and/or the exploration radiation 112, and the reflection of the interaction radiation 110 and/or the reflection radiation 114.

As shown in FIG. 1, the optical arrangement 106 may comprise a lens 106a with a side 118 facing the interior of a casing 117 of the measurement unit 103 and another side 119 facing the exterior of the casing 117. This lens 106a may have the function of e.g. collimating and/or focusing the scanning radiation 108 towards common radiation point/direction 115, and a similar function in "reverse" direction for guiding the interaction radiation 110 from the coating 100 towards the ingress-protected receiver 109. The optical arrangement 106 may further comprise an optical hardware or conditioner 106b for proper conditioning of the scanning radiation 108 before reaching the lens 106a. Optical hardware 106b and lens 106a may thus optically cooperate to optimize convergence of the scanning radiation 108 towards common radiation point/direction 115. Optical hardware or conditioner 106b may be movable and adjustable to properly optimize conditioning of the scanning radiation 108 before reaching the lens 106a and of the interaction radiation 110 before reaching ingress-protected receiver 109.

FIG. 1 includes an upper main schema and a lower schema, the latter corresponding to a more detailed view of a particular implementation and/or arrangement of the coating scanner 104. The lower schema shows the coating scanner 104 from a point of view 120 at a lateral side of the coating scanner 104, clearly showing the ingress-protected receiver 109 and the ingress-protected transmitter 107. Ingress-protected receiver 109 may be arranged with an inclination or angle 122 with respect to common radiation direction/point 115. Ingress-protected transmitter 107 may be arranged with an inclination or angle 121 with respect to common radiation direction/point 115.

The lower schema also roughly shows influence of the lens 106a (i.e. collimating and/or focusing properties or parameters) and emission angle 121 to cause convergence of the scanning radiation 108 towards common radiation point/direction 115. The lower schema also roughly shows influence of the lens 106a (i.e. collimating and/or focusing properties or parameters) and reception angle 122 to cause path of the interaction radiation 110 towards ingress-protected receiver 109. The described arrangement of ingress-protected transmitter 107 and receiver 109, influence of the lens 106a on scanning and interaction radiations 108, 110, and consequent inclinations/angles 121, 122 permits avoiding any interference of scanning and interaction radiations 108, 110 with mirror 106c. Each ingress-protected transmitter 107 may be configured to cause a particular incidence angle and/or particular polarization of scanning radiation 108, and its respective ingress-protected receiver 109 may be arranged depending on said particular incidence angle and/or particular polarization. These arrangement, lens-related and angle-based principles described about coating scanner 104 may be of equal or similar application to vibration explorer 105 with same or similar effects.

The determiner unit (not shown) may be configured to determine the one or more features of the coating 100 depending on (e.g. signals and/or data characterizing) the interaction radiation 110 sensed by the coating scanner 104 and (e.g. signals and/or data characterizing) the vibration detected by the vibration explorer 105. Therefore, the determiner unit may be connected with the coating scanner 104 and the vibration explorer 105 such that the determiner unit (not shown in this FIG.) may receive signals and/or data characterizing the interaction radiation 110 (from coating scanner 104) and the vibration of the coating 100 (from vibration explorer 105). The determiner unit (not shown) may be arranged remotely with respect to the measurement unit 103

The coating scanner 104 may be a Terahertz or THz scanner. The ingress-protected receiver 109 and the ingress-protected transmitter 107 may be based on antennas, such as e.g. one or more photoconductive LT-InGaAs antennas. The coating scanner 104 may include one or more optical generators (not shown). The optical generator(s) may be laser generator(s). The coating scanner 104 may comprise one or more delay-lines (not shown) including a movable delay-line for the coating scanner 104 to operate with different scanning windows, and/or a delay-line adjustable by hardware for the coating scanner 104 to operate with one scanning window adjustable through displacement of the delay-line.

Figure 2:
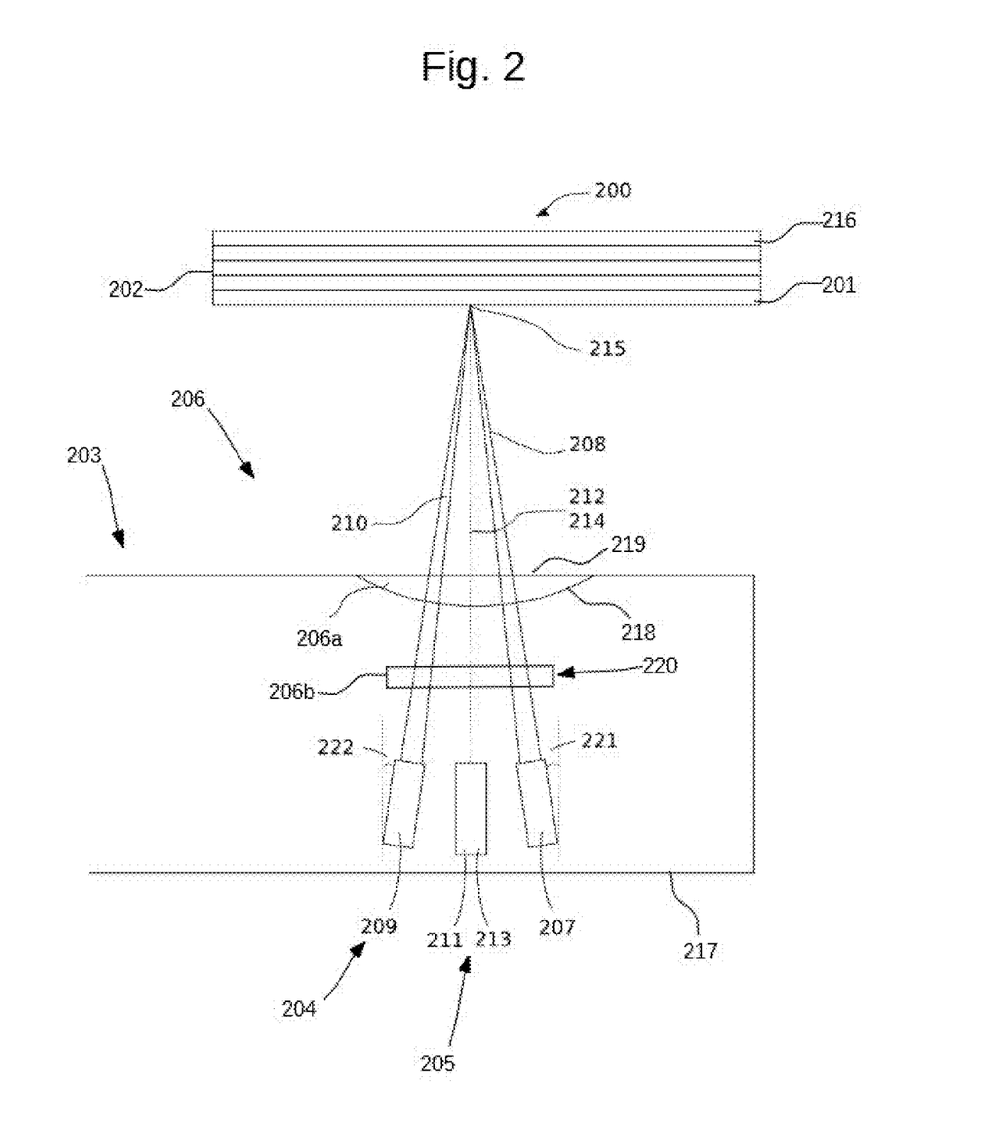
FIG. 2 is a block diagram schematically illustrating systems for contactless determining coating feature(s) according to further examples.

FIG. 2 is a block diagram schematically illustrating systems for contactless determining feature(s) of a coating 200 according to further examples. Coating 200 may include several layers 202 including an outermost layer 201 and innermost layer 216. Some components in measurement unit 203 may be equal or similar to corresponding components in measurement unit 103 of FIG. 1. For example, coating scanner 204 with ingress-protected transmitter 207 and ingress-protected receiver 209 may be similar to coating scanner 104 with ingress-protected transmitter 107 and ingress-protected receiver 109 of FIG. 1. Details about scanning radiation 208 and interaction radiation 210 may thus be similar to those commented with respect to scanning radiation 108 and interaction radiation 110 of FIG. 1. Determiner unit or module (not shown) may also be similar to determiner unit commented with respect to FIG. 1.

A difference with respect to FIG. 1 may reside in optical arrangement 206 which, in the case of FIG. 2, may not comprise the mirror 106c of FIG. 1. Optical arrangement 206 may comprise a lens 206a similar to the lens 106a of FIG. 1 but with particular optical features. Lens 206a may be arranged relative to a casing 217 of the measurement unit 203 with a side 218 of the lens 206a facing interior of the casing 217 and another side 219 of the lens 206a facing exterior of the casing 217. Lens 206a may be transparent for scanning and interaction radiations 208, 210 and for exploration and reflection radiations 212, 214. Optical arrangement 206 may also comprise an optical hardware or conditioner 206b similar to the optical hardware or conditioner 106b of FIG. 1, arranged at a position 220 between coating scanner 204 and vibration explorer 205 and the lens 206a as in the setup of FIG. 1. The vibration explorer 205 with ingress-protected emitter 211 and ingress-protected sensor 213 may be similar to vibration explorer 105 with ingress-protected emitter 111 and ingress-protected sensor 113 of FIG. 1 but arranged differently in comparison to the configuration of FIG. 1. This different arrangement permits avoiding the necessity of the mirror 106c of FIG. 1 because exploration and reflection radiations 212, 214 do not need to be redirected/reflected. As shown in FIG. 2, vibration explorer 205 may be arranged between ingress-protected transmitter 207 and ingress-protected receiver 209 of the coating scanner 204. Scanning and exploration radiations 208, 212 may converge towards common radiation point/direction 215 similarly as explained with reference to FIG. 1 but without the need of reflection of the exploration radiation 212. Similar considerations about inclinations or angles 121, 122 in FIG. 1 may be applicable to inclinations or angles 221, 222. In alternative setups, arrangement of coating scanner 204 and of vibration explorer 205 may be interchangeable between each other and the overall setup may produce same or similar effects as described with respect to FIG. 2.

Figure 3A:
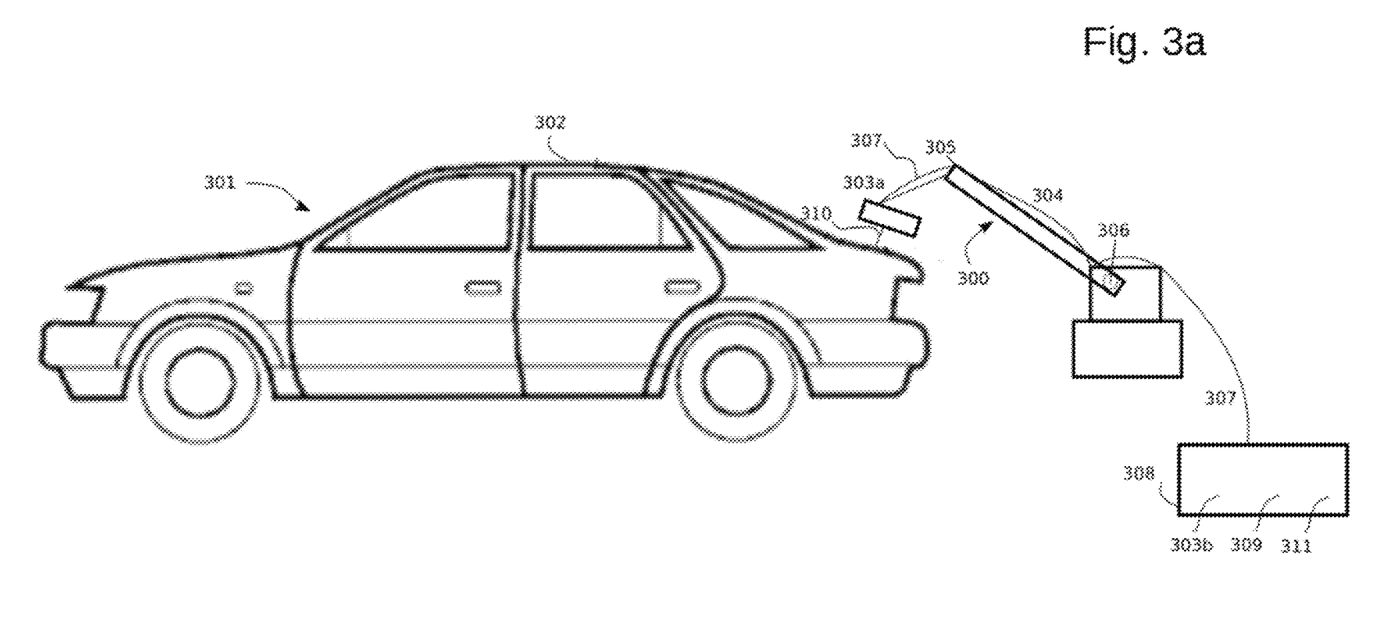
FIGS. 3a and 3b are block diagrams schematically illustrating different examples of systems for contactless determining coating feature(s) according to present disclosure.

FIG. 3a is a block diagram schematically illustrating systems for contactless determining coating feature(s) according to still further examples. As generally shown in this figure, systems for contactless determining coating feature(s) may be used to examine paint coatings 302 on vehicles such as e.g. cars 301, within or outside corresponding manufacturing line. Systems according to present disclosure may be applicable to examination of any layered coating on any product or object with a coating, either inside or outside manufacturing line.

Systems for contactless determining coating feature(s) may comprise a positioner unit 300 configured to move measurement unit 303a towards a target position relative to the coating 302. The measurement unit 303a may be equal or similar to any of the measurement units 103, 203 described herein. Accordingly, reference numbers from FIGS. 1 and 2 may be re-used in following description of FIG. 3.

The target position of the measurement unit 303a may correspond to a position that causes the common radiation point/direction 115, 215 to be substantially perpendicular to the coating 302. Additionally or alternatively, the target position may correspond to a position at which the ingress-protected transmitter 107, 207 of the coating scanner 104, 204 and/or the ingress-protected emitter 111, 211 of the vibration explorer 105, 205 is distanced from the coating 302 at a target distance 310. Coating scanner 104, 204 and its components (ingress-protected transmitter 107, 207, ingress-protected receiver 109, 209, etc.), and vibration explorer 105, 205 and its components (ingress-protected emitter 111, 211, ingress-protected sensor 113, 213, etc.), and optical arrangement 106, 206 may be adjustable to define different possible target distances 310.

The positioner unit 300 may include a position detector (not shown) configured to detect when the measurement unit 303a reaches the target position. The position detector may be based on e.g. a set of triangulation sensors. The positioner unit 300 may include an actuator configured to move the measurement unit 303a towards the target position. The actuator may include e.g. a robotic arm 304, which may have different articulated joints 305, 306 with corresponding degrees of freedom. The positioner unit 300 may include a collision detector configured to detect, in use, when the positioner unit 300 and/or measurement unit 303a gets too close to external element(s). The positioner unit 300 may further include a collision protector configured to protect, in use, the positioner unit 300 and/or measurement unit 303a from damages due to collision with some external element(s).

As generally illustrated in FIG. 3a, systems according to present disclosure may include a controller unit 309 configured to control all or part of the other units in the system. The control unit 309 that may be arranged inside a (e.g. suitably protected) casing 308 which may furthermore contain the determiner unit 311 or complementary components 303b of the measurement unit 303a, such as e.g. optical generator(s), delay line(s), etc. The control unit 309 may be configured to e.g. send control signals to robotic arm 304, measurement unit 303a, 303b, etc. to suitably control each of said units for them to synchronously cooperate and reliably extract features from the coating 302.

Measurement unit components 303a may include some of (or all of) the elements of the coating scanner 104, 204 and vibration explorer 105, 205, such as e.g. ingress-protected transmitter 107, 207, ingress-protected receiver 109, 209, ingress-protected emitter 111, 211, ingress-protected sensor 113, 213, etc. Measurement unit components 303b may include some other elements of the coating scanner 104, 204 and vibration explorer 105, 205, such as e.g. optical generator(s), delay line(s) etc. Measurement unit components 303a and 303b are connected to each other through different length wired connections 307. Some of such connections may be electrical to transmit e.g. control signals, operation signals, data signals, power signals etc. and some other connections may be for transmitting optical signals. Key characteristics of the optical signals may be preserved regardless of the distance cable 307 through techniques such as dispersion pre-compensation, cable with dispersion compensation, Bragg dispersion compensation, or any other known technique that may suitably compensate for distance effects.

Figure 3B:
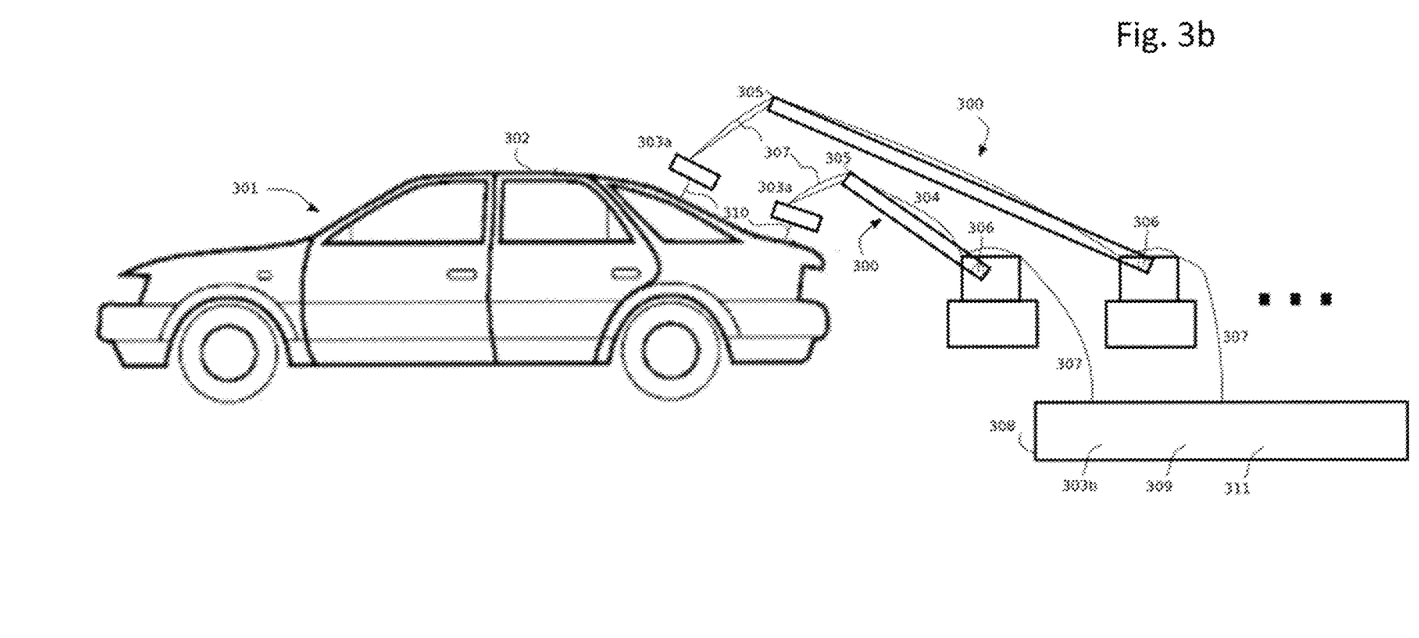

FIG. 3b is a block diagram schematically illustrating systems for contactless determining coating feature(s) according to yet further examples. According to this figure, systems for contactless determining coating feature(s) may include different systems 300, 303a according to e.g. FIG. 3a connected through connection(s) 307 to common hardware 303b, 309, 311, which may be contained in e.g. casing 308. Single control unit 309, single determiner unit 311 and single measurement unit part 303b may thus be shared by different systems 300, 303a according to a one-to-many approach (one common hardware 303b, 309, 311 combined with many systems 300, 303a). Functioning of this one-to-many configuration may be similar as the one-to-one setups described with respect to other figures but with common hardware 303b, 309, 311 dedicated to several systems 300, 303a simultaneously. This way, the coating 302 may be analysed simultaneously at different points or regions of the coated product/object 301 and, accordingly, more reliable, efficient, complete results may be obtained.

Figure 4:
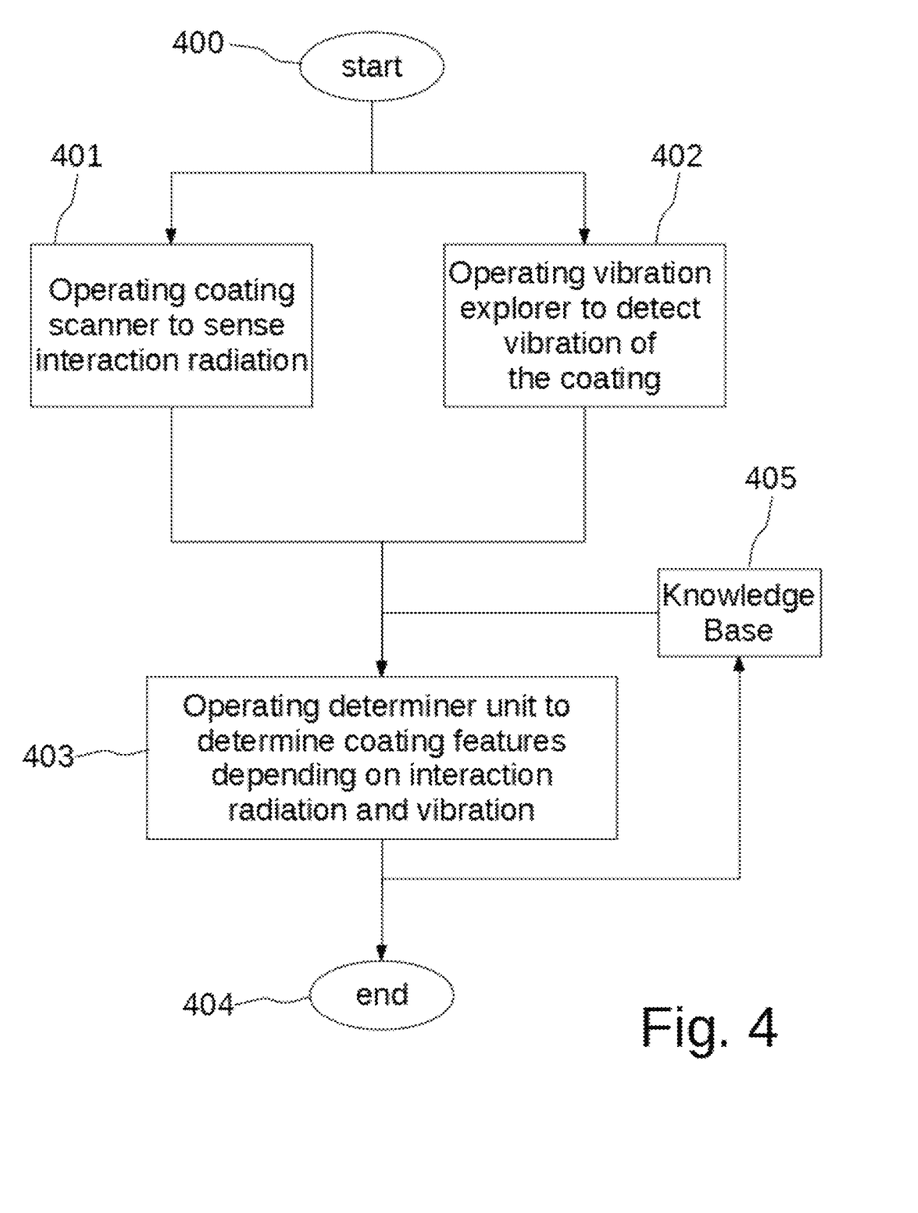
FIG. 4 is a flow chart schematically illustrating methods of contactless determining coating feature(s) according to examples.

FIG. 4 is a flow chart schematically illustrating methods of contactless determining coating feature(s) according to examples. As generally shown in the figure, contactless determination methods may be initiated (e.g. at block 400) upon detection of a starting condition such as e.g. a request for starting the method or an invocation of the method from operator interface or the like. Since contactless determination methods according to FIG. 4 are performable by systems according to previous FIGS., number references from FIGS. 1, 2 and 3 may be reused in following description of FIG. 4.

Contactless determination methods may further include (e.g. at block 401) operating 401 a coating scanner 104, 204 (in measurement unit 103, 203) to cause ingress-protected transmitter 107, 207 of the coating scanner 104, 204 to emit scanning radiation 108, 208, and to cause ingress-protected receiver 109, 209 of the coating scanner 104, 204 to sense interaction radiation 110, 210 caused by interaction of the scanning radiation 108, 208 with the one or more layers 102, 202 of the coating 100, 200. This functionality implemented at block 401 may be performed by e.g. coating scanner module such as modules 104, 204 previously described with reference to FIGS. 1 and 2. Functional details and considerations explained about said modules 104, 204 may thus be similarly attributed to method block 401.

Contactless determination methods may still further include (e.g. at block 402) operating vibration explorer 105, 205 (in measurement unit 103, 203) to cause ingress-protected emitter 111, 211 of the vibration explorer 105, 205 to emit exploration radiation 112, 212, and to cause an ingress-protected sensor 113, 213 of the vibration explorer 105, 205 to sense reflection radiation 114, 214 caused by reflection of the exploration radiation 112, 212 on the coating 100, 200 to detect a vibration of the coating 100, 200 depending on the reflection radiation 114, 214. This functionality implemented at block 402 may be performed by e.g. vibration explorer module such as modules 105, 205 previously described with reference to FIGS. 1 and 2. Functional details and considerations explained about said modules 105, 205 may thus be similarly attributed to method block 402.

As generally explained with reference to FIGS. 1 and 2, optical arrangement 106, 206 (in measurement unit 103, 203) may guide scanning radiation 108, 208 and/or exploration radiation 112, 212 towards common radiation point/direction 115, 215, and may guide interaction radiation 110, 210 towards ingress-protected receiver 109, 209 and/or reflection radiation 114, 214 towards ingress-protected sensor 113, 213.

Contactless determination methods may yet further include (e.g. at block 403) operating determiner unit 311 to cause determination of the one or more features of the coating 100, 200 depending on interaction radiation 110, 210 sensed by the coating scanner 104, 204 and vibration detected by the vibration explorer 105, 205. This functionality implemented at block 403 may be performed by e.g. determiner unit or module 311 previously described with reference to other FIGS. Functional details and considerations explained about said determiner modules 311 may thus be similarly attributed to method block 403.

Contactless determination methods may also include obtaining data from Knowledge Base 405 containing knowledge learned in previous executions to enrich even more of the features of the determination performed at e.g. block 403. Similarly, output data or knowledge learned at present execution may be stored in Knowledge Base 405 to enrich even more accumulated knowledge for future executions of the method. Knowledge stored or storable in Knowledge Base may comprise e.g. optimization parameters, optimized model, acceptability thresholds, etc.

Contactless determination methods may terminate (e.g. at block 404) when an ending condition is detected such as e.g. once the one or more features of the coating 100, 200 have been determined.

Contactless determination methods may further comprise generating a simulated signal based on a physical model, and performing an optimization process to optimize parameter(s) of the physical model to modify the simulated signal until the simulated signal fits the interaction radiation 110, 210 sensed by ingress-protected receiver 109, 209 of the coating scanner 104, 204. In some configurations, said processing based on the simulated signal and the optimization process may be performed by the determiner unit 311. Suitable connections between the determiner unit 311 and coating scanner 104, 204 and vibration explorer 105, 205 may thus exist for the determiner unit 311 receive corresponding data and/or signals from coating scanner 104, 204 and vibration explorer 105, 205.

The optimization process may be based on at least one of discrete Differential Evolution, Topographical Global Optimization, Basin-hopping, SHG, Dual Annealing, etc. Additionally or alternatively, the optimization process may be an adaptive and iterative optimization process with stopping criteria based on error function. Additionally or alternatively, the optimization process may be defined to be performed in time domain and/or in frequency domain. The simulated signal may be assumed as fitting the sensed interaction radiation 110, 210 when a deviation between the simulated signal and the sensed interaction radiation 110, 210 is within an acceptability threshold. This acceptability threshold may have been defined depending on previous experiments and/or depending on knowledge accumulated during previous executions of contactless determination methods.

The feature(s) of the coating 100, 200 may be determined depending on the optimized parameter(s) of the physical model, taking into account that said optimized parameters have caused the fitting of the simulated signal into the sensed interaction radiation 110, 210 and, therefore, said optimized parameters characterize the interaction of the scanning radiation 108, 208 with the one or more layers of the coating 100, 200. In particular, the feature(s) of the coating 100, 200 may be determined depending on the optimized parameter(s) of the physical model and furthermore on a vibration compensation based on the vibration detected by the vibration explorer 105, 205.

Contactless determination methods may further include storing knowledge from execution of the method in a knowledge base. This knowledge may include knowledge items such as e.g. an optimized physical model, and/or one or more optimized parameter(s) of the physical model, and/or an evolution of the parameter(s) during optimization process, and/or one or more determined feature(s) of the coating 100, 200, and/or a correlation/relationship between one or more of the determined feature(s) and one or more of the other knowledge items, etc.

The optimization process may include retrieving from the knowledge base an optimized physical model from previous executions of the method, and using said retrieved optimized physical model as the physical model to generate the simulated signal in the current execution of the method.

The coating scanner 104, 204 may be operated to cause sensing of the interaction radiation 110, 210 by applying to the sensed interaction radiation 110, 210 one or more filtering techniques for noise reduction, such as e.g. Recursive Least Squares filter, and/or Wiener-Kolmogorov filter, and/or Least Mean Square Error, and/or Kalman filter, and/or Bishrink filter, and/or theoretical-noise-free representation of the sensed interaction radiation 110, 210, and/or Genetic Algorithms combined with adaptive thresholding, and/or matched filter and thresholding functions along with transformation techniques such as Fourier, Wavelets and Empirical Mode Decomposition EMD, etc.

Feature(s) of the coating 100, 200 that may be determined by methods according to present disclosure may include e.g. the number of layers, and/or thickness per layer, and/or layer blending level, and/or refractive index per layer, and/or electrical parameters per layer, and/or magnetic parameters per layer, and/or electromagnetic parameters per layer, and/or Fresnel coefficients, and/or propagation constants, and/or propagation angles, and/or roughness, etc.

Methods of contactless determining coating feature(s) according to present disclosure may thus be qualified as adaptive and/or self-learning methods in the sense that they are continuously generating knowledge and learning from it. In particular, such proposed methods may be adaptive to the production and each time that new coating features are extracted or determined, the method may learn about e.g. the physical model that has been used and may store this knowledge (in e.g. knowledge base) such that said stored knowledge may be used in future executions of the method. Methods according to present disclosure are also adaptive regarding the model parameters of the physical model, which means that physical parameters such as e.g. refraction and absorption indices can be fixed, variable or predetermined in advance over the frequency bandwidth of the scanning radiation used to inspect the layers of the coating.

Measuring the innermost layer prior to determining the one or more features of the full coating may be or may not be required in methods and systems according to present disclosure. Innermost layers on which the coating layers may be deposited are also diverse, such as e.g. ferrous and non-ferrous metals, fibre composite materials, polymeric materials (e.g. thermos-plastic materials), etc.

As used herein, the term "module" may be understood to refer to software, firmware, hardware and/or various combinations thereof. It is noted that the modules are exemplary. The modules may be combined, integrated, separated, and/or duplicated to support various applications. Also, a function described herein as being performed by a particular module may be performed by one or more other modules and/or by one or more other devices instead of or in addition to the function performed by the described particular module.

The modules may be implemented across multiple devices, associated or linked to corresponding methods of contactless determining coating feature(s) proposed herein, and/or to other components that may be local or remote to one another. Additionally, the modules may be moved from one device and added to another device, and/or may be included in both devices, associated to corresponding methods of contactless determining coating feature(s) proposed herein. Any software implementations may be tangibly embodied in one or more storage media, such as e.g. a memory device, a floppy disk, a compact disk (CD), a digital versatile disk (DVD), or other devices that may store computer code.

The methods of contactless determining coating feature(s) according to present disclosure may be implemented by computing systems, apparatuses or methods, electronic systems, apparatuses or methods or a combination thereof. The computing systems, apparatuses or methods may be a set of instructions (e.g. a computer program) and then the methods of contactless determining coating feature(s) may comprise a memory and a processor, embodying said set of instructions stored in the memory and executable by the processor. These instructions may comprise functionality or functionalities to execute corresponding methods of contactless determining coating feature(s) such as e.g. the ones described with reference to other figures.

In case the methods of contactless determining coating feature(s) are implemented only by electronic systems, apparatuses or methods, a controller of the system may be, for example, a CPLD (Complex Programmable Logic Device), an FPGA (Field Programmable Gate Array) or an ASIC (Application-Specific Integrated Circuit).

In case the methods of contactless determining coating feature(s) are a combination of electronic and computing systems, apparatuses or methods, the computing systems, apparatuses or methods may be a set of instructions (e.g. a computer program) and the electronic systems, apparatuses or methods may be any electronic circuit capable of implementing corresponding steps of the methods of contactless determining coating feature(s) proposed herein, such as the ones described with reference to other figures.

The computer program(s) may be embodied on a storage medium (for example, a CD-ROM, a DVD, a USB drive, a computer memory or a read-only memory) or carried on a carrier signal (for example, on an electrical or optical carrier signal).

The computer program(s) may be in the form of source code, object code, a code intermediate source and object code such as in partially compiled form, or in any other form suitable for use in implementing the methods of contactless determining coating feature(s) according to present disclosure. The carrier may be any entity or device capable of carrying the computer program(s).

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other systems, apparatuses or methods.

When the computer program(s) is/are embodied in a signal that may be conveyed directly by a cable or other device or systems, apparatuses or methods, the carrier may be constituted by such cable or other device or systems, apparatuses or methods. Alternatively, the carrier may be an integrated circuit in which the computer program(s) is/are embedded, the integrated circuit being adapted for performing, or for use in the performance of, the methods of contactless determining coating feature(s) proposed herein.

Although only a number of examples have been disclosed herein, other alternatives, modifications, uses and/or equivalents thereof are possible. Furthermore, all possible combinations of the described examples are also covered. Thus, the scope of the disclosure should not be limited by particular examples, but it should be determined only by a fair reading of the claims that follow.

The invention claimed is:

1. A system for contactless determination of one or more features of a coating with one or more layers, the system comprising:
   a plurality of units having a determiner unit and a measurement unit including an ingress-protected coating scanner, an ingress-protected vibration explorer and an optical arrangement;
   the ingress-protected coating scanner including an ingress-protected transmitter configured to emit a scanning radiation and an ingress-protected receiver configured to sense an interaction radiation caused by interaction of the scanning radiation with the one or more layers of the coating;
   the ingress-protected vibration explorer including an ingress-protected emitter configured to emit an exploration radiation and an ingress-protected sensor configured to sense a reflection radiation caused by reflection of the exploration radiation on the coating to detect a vibration of the coating depending on the sensed reflection radiation;
   the optical arrangement including either at least one mirror configured to reflect the scanning radiation towards a common radiation direction with the exploration radiation and at least one mirror configured to reflect the interaction radiation towards the ingress-protected receiver;
   at least one mirror configured to reflect the exploration radiation towards a common radiation direction with the scanning radiation and at least one mirror configured to reflect the reflection radiation towards the ingress-protected sensor; and
   the determiner unit being configured to determine the one or more features of the coating depending on the interaction radiation sensed by the ingress-protected coating scanner and the vibration detected by the ingress-protected vibration explorer.

2. A system according to claim 1, each of the mirrors being movable to adjust an inclination of the mirror to optimize the reflection of the scanning radiation and/or the exploration radiation, and the reflection of the interaction radiation and/or the reflection radiation.

3. A system according to claim 1, the plurality of units including a positioner unit configured to move the measurement unit towards a target position relative to the coating.

4. A system according to claim 3, the target position being disposed that the common radiation direction is substantially perpendicular to the coating.

5. A system according to claim 3, the target position being disposed that the ingress-protected transmitter of the ingress-protected coating scanner and/or the ingress-protected emitter of the ingress-protected vibration explorer is distanced from the coating at a target distance.

6. A system according to claim 3, the positioner unit including a position detector configured to detect when the measurement unit reaches the target position.

7. A system according to claim 3, the positioner unit including an actuator configured to move the measurement unit towards the target position.

8. A system according to claim 1, the ingress-protected coating scanner being a Terahertz or THz scanner.

9. A method of contactless determining one or more features of a coating with one or more layers, the method comprising:
   operating an ingress-protected coating scanner in a measurement unit to cause an ingress-protected transmitter of the ingress-protected coating scanner to emit a scanning radiation, and to cause an ingress-protected receiver of the ingress-protected coating scanner to sense an interaction radiation caused by interaction of the scanning radiation with the one or more layers of the coating;
   operating an ingress-protected vibration explorer in the measurement unit to cause an ingress-protected emitter of the ingress-protected vibration explorer to emit an exploration radiation, and to cause an ingress-protected sensor of the ingress-protected vibration explorer to sense a reflection radiation caused by reflection of the exploration radiation on the coating to detect a vibration of the coating depending on the sensed reflection radiation;
   operating a determiner unit to cause determination of the one or more features of the coating depending on the interaction radiation sensed by the ingress-protected coating scanner and the vibration detected by the ingress-protected vibration explorer;
   the scanning radiation being reflected by at least one mirror towards a common radiation direction with the exploration radiation and the interaction radiation being reflected by at least one mirror towards the ingress-protected receiver; or
   the exploration radiation being reflected by at least one mirror towards a common radiation direction with the scanning radiation and the reflection radiation being reflected by at least one mirror towards the ingress-protected sensor;

each of said mirrors being included in an optical arrangement in the measurement unit.

10. A method according to claim 9, further comprising generating a simulated signal based on a physical model;
performing an optimization process to optimize one or more parameters of the physical model to modify the simulated signal until the simulated signal fits the interaction radiation sensed by the ingress-protected receiver of the ingress-protected coating scanner.

11. A method according to claim 10, the optimization process being an adaptive and iterative optimization process with stopping criteria based on an error function with an acceptability threshold.

12. A method according to claim 10, the optimization process being performed in time domain and/or in frequency domain.

13. A method according to claim 10, the determining the one or more features of the coating including:
determining the one or more features of the coating depending on the optimized one or more parameters of the physical model, taking into account that said optimized parameters have caused the fitting of the simulated signal into the sensed interaction radiation and, therefore, said optimized parameters characterize the interaction of the scanning radiation with the one or more layers of the coating.

14. A method according to claim 13, the determining the one or more features of the coating including determining the one or more features of the coating depending on the optimized one or more parameters of the physical model and on a vibration compensation based on the vibration detected by the ingress-protected vibration explorer.

15. A method according to claim 10, further including storing knowledge derived from performing the method in a knowledge base, said knowledge including at least one of the following knowledge items: an optimized physical model, one or more optimized parameters of the physical model, an evolution of the one or more parameters during optimization process, one or more determined features of the coating, a correlation and/or relationship of the one or more determined features with one or more of the other knowledge items, or an evolution of the acceptability threshold.

16. A method according to claim 15, the optimization process including retrieving from the knowledge base an optimized physical model to be used as the physical model to generate the simulated signal.

17. A computer program comprising program instructions for causing a computing system to perform a method according to claim 9 of contactless determining of one or more features of a coating.

18. A computing system for contactless determining one or more features of a coating, the computing system comprising a memory and a processor, embodying instructions stored in the memory and executable by the processor, the instructions comprising functionality to execute a method according to claim 9 of contactless determining of one or more features of a coating.

* * * * *